United States Patent [19]
Fischer et al.

[11] 4,217,063
[45] Aug. 12, 1980

[54] CENTER SUPPORT FOR BLADE OF EARTHMOVER

[75] Inventors: Karl-Heinz Fischer, Laatzen; Rudolf Perkert, Seelze, both of Fed. Rep. of Germany

[73] Assignee: Massey-Ferguson Services N.V., Curacao, Netherlands Antilles

[21] Appl. No.: 970,899

[22] Filed: Dec. 19, 1978

[30] Foreign Application Priority Data

Dec. 24, 1977 [DE] Fed. Rep. of Germany ....... 2758093

[51] Int. Cl.² .................... F16D 3/80; F16L 17/00
[52] U.S. Cl. ..................................... 403/37; 172/804
[58] Field of Search ............... 403/37, 38, 166, 31, 403/36, 112; 172/801, 803, 804; 267/162

[56] References Cited

U.S. PATENT DOCUMENTS

| 1,829,964 | 11/1931 | Randall | 403/38 |
|---|---|---|---|
| 2,828,984 | 4/1958 | Ho Chow | 403/38 |
| 2,977,777 | 8/1961 | Bernitz | 403/166 X |
| 3,208,302 | 9/1965 | Lewis et al. | 403/166 X |
| 3,265,380 | 8/1966 | Hall et al. | 172/801 X |
| 3,858,665 | 1/1975 | Winker | 267/162 X |
| 3,871,193 | 3/1975 | Young | 403/166 X |
| 3,922,040 | 11/1975 | Carter | 172/803 X |
| 4,106,170 | 8/1978 | Schoenweis | 403/166 X |

FOREIGN PATENT DOCUMENTS

1634853 10/1970 Fed. Rep. of Germany .......... 172/803

Primary Examiner—Wayne L. Shedd
Attorney, Agent, or Firm—William R. Nolte

[57] ABSTRACT

A center support member for a tiltable swivelling grading blade on an earthmoving machine which prevents the occurence of internal stresses in the blade generated by tilting of the blade is in the form of a ball and socket joint attached to the center rear of the blade and to a carrier frame on the machine. A shaft slidable in a sleeved mounting carries the ball portion of the joint at one end and the other end of the shaft is spring urged towards the blade by spring means in the sleeved mounting. Stop means in the sleeved mounting limit the stroke of the shaft. Additionally, a piston engaged by the spring means in a chamber in the sleeved mounting is arranged to force lubricant through a feed line to the shaft in response to axial movement of the shaft.

4 Claims, 2 Drawing Figures

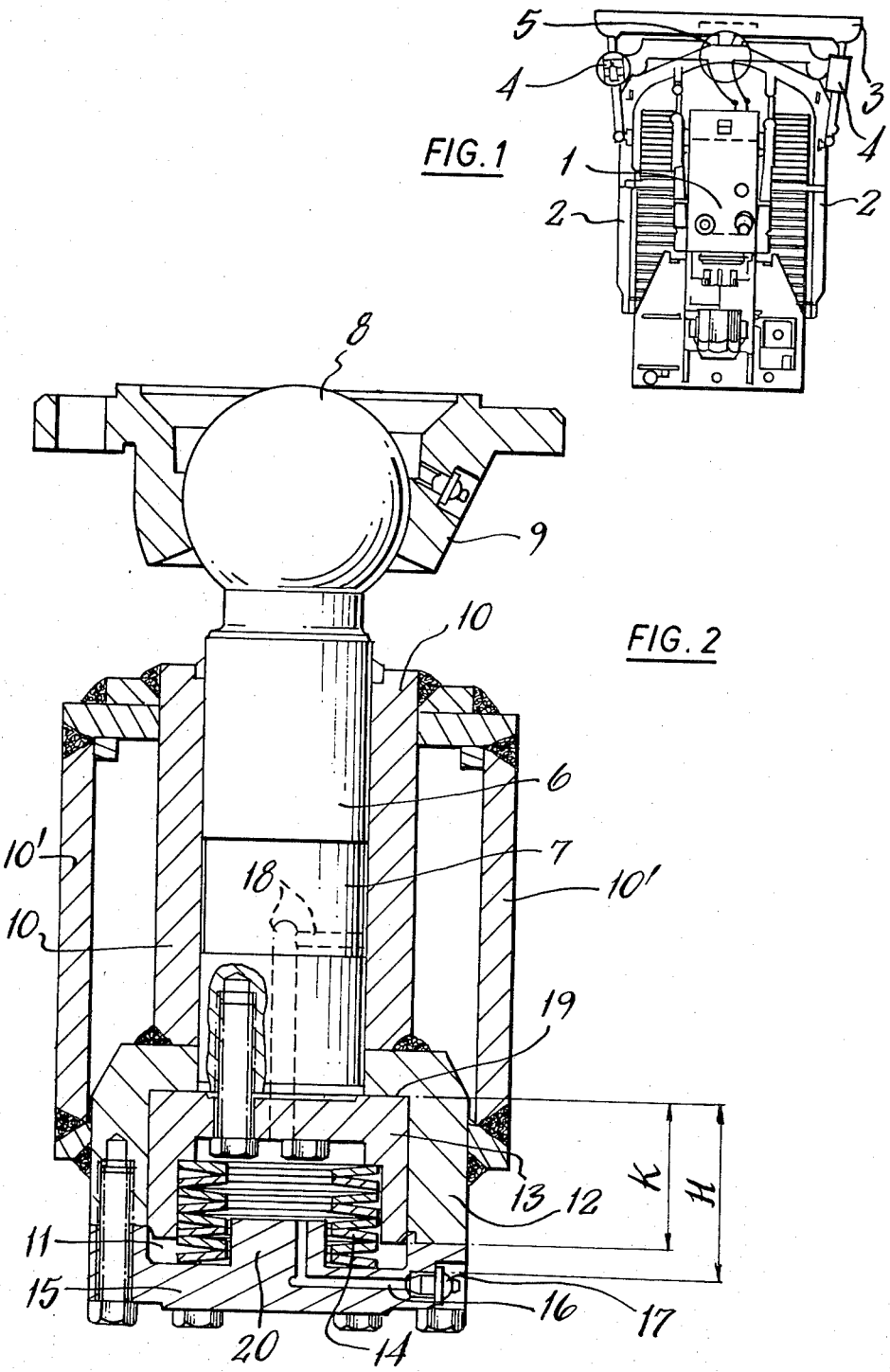

CENTER SUPPORT FOR BLADE OF EARTHMOVER

BACKGROUND OF THE INVENTION

This invention concerns a centre support for a tiltable swivelling grading blade on an earthmoving machine.

It is known that on tilting of a grading blade there occur kinematically conditioned high internal stresses in the blade and in the adjoining parts. These are reduced in tilting machines by means of known tilt-equalizing devices. But it is also known, on the other hand, that a centre support may be provided that, according to U.S. Pat. No. 3,234,670, consists of a shaft axially displaceable in a supporting frame and engaging the rear face of the blade by way of a linkage. Such supports have the disadvantage that in service they rapidly become dirty and wear quickly, so that the supporting action becomes questionable. On the other hand, with so-called swivelling blade equipment the customary tilt-equalization devices cannot be used, since the blade possesses an additional central articulation point which serves for vertical support, as pivot point for swivelling the blade, and, together with the outer pivot points, for horizontal bracing of the blade.

It is an object of the invention to equip a tiltable swivelling blade on earthmoving machines with a centre support which is equal to all operating requirements and which prevents the occurence of internal stresses in the blade.

SUMMARY OF THE INVENTION

According to the present invention there is provided a central support for a tiltable, swivelling grading blade on an earthmoving machine comprising a ball and socket joint adapted to be attached to the rear face of the blade, the ball portion of the joint being provided with a shaft axially slidable in a sleeve in a mount secured to a carrier frame for supporting the blade, wherein the shaft is axially spring urged in the direction of the blade and the stroke of the shaft is limited by stop means in the mount.

The invention utilizes a shaft which is axially displaceable in its mounting and which engages the rear face of the blade through a ball and socket joint, the axial stroke of the shaft being limited by stops, and a spring is provided to urge the shaft against one of the stops in the forward position of the shaft. By use of a spring element of this kind, adequate horizontal support of the blade is achieved on the one hand, and on the other hand it is ensured that the initial position of the shaft is maintained during swivelling of the blade, i.e. the centre pivot and the outer pivots (articulation points) remain in a desired geometric dimensional relationship.

Also according to the invention, the shaft is provided at the end remote from the ball portion with a piston head having a larger outside diameter than that of the shaft the piston head being a close fit and axially slidable in a cylindrical chamber forming an extension of the sleeve, a base member closing the cylindrical chamber and spring means compressed between the piston head and the base member.

Preferably the piston head is of a cup shape having an open end facing the chamber base, the spring bearing against the chamber base and being accommodated in the head. In the chamber is preferably provided a lubricant feed line opening into the chamber and closed towards the outside by a non-return valve and in the shaft is provided another lubricant passage reaching to about the middle of the shaft length and opening to the shaft guiding sleeve. Such an arrangement of the lubricant feed line gives substantial advantages, since during working of the blade the shaft constantly slides back and forth in its sleeve and thus pumps lubricant into the shaft sleeve so that easy movement is always achieved and wear of the shaft does not occur.

BRIEF DESCRIPTION OF THE DRAWINGS

By way of example, one embodiment of the invention will now be described with reference to the accompanying drawings of which FIG. 1 is a schematic plan view of an earthmoving machine and FIG. 2 is a longitudinal section through a centre support in accordance with the invention.

DESCRIPTION OF A PREFERRED EMBODIMENT

In an earthmoving machine as shown in FIG. 1, a track-laying vehicle is provided with a forward-projecting carrier frame 2 which carries a tiltable swivelling blade 3. By means of adjusting devices, e.g. hydraulic cylinders 4, arranged at the sides, the swivel blade 3 held by the centre support 5 is moved and tilted as required.

The support 5 includes a cylindrical shaft 6, with a reduced diameter portion 7 forming a shallow groove for the purposes of lubrication, and the shaft which is preferably chromium plated carries a ball head 8 at its forward end. This head is attached to the middle of the swivel blade 3 and is received in a socket bearing 9.

The shaft 6 is axially slidable in a guiding sleeve 10, which is firmly mounted in a supporting structure or frame, 10'.

At its rear end the guiding sleeve 10 opens into a wider chamber 12, within the interior 11 of which a cup shaped piston-like head 13, attached to the end of shaft 6, operates. The chamber 12 is tightly sealed by a chamber base cover 15. Within the interior 11 of the chamber 12 a stack of dished spring washers 14 is provided, which is received in the interior of the cup shaped piston 13. The dished springs 14 are preloaded between the chamber base cover 15 and the head 13 of the shaft 6, so that the shaft is always urged into its forward limiting position.

The stroke of the shaft is governed by the relation between the piston height K and the chamber height H. The end portion of the spring loaded piston 13 strikes against the base 15 of the chamber 11 in one direction or against the shoulder 19 in the other direction.

A lubricant feed line 16 is provided in the chamber bottom 15 through a boss 20, which also serves to locate springs 14 and the feed line is closed towards the outside by a non-return valve 17. Also, within the shaft 6 is provided a longitudinal and cross-drilled passage 18, communicating with the reduced section 7 through which the interior wall of the guiding sleeve 10 is supplied with lubricant. The forward and return motion of the shaft 6 provides a certain amount of pumping action by which lubricant is constantly transported from the chamber 11 to those places where lubrication is required.

We claim:

1. A central support for a tiltable swivelling grading blade on an earthmoving machine including ball and socket joint means for attachment to the rear face of said blade, said ball having a shaft portion interconnecting a piston at its opposite end, housing means including a sleeve for said shaft and mean's defining a chamber coaxially arranged with said sleeve to receive said piston for sliding movement therein, cover means for closing said chamber, spring means interposed between said piston and said cover to normally urge said shaft and ball in a direction towards said blade, said housing means further including a portion at one end of said chamber defining a stop to limit axial travel of said piston in one direction of movement, and whereby said cover limits travel of said piston in an opposite direction of movement.

2. A central support according to claim 1 wherein the piston head is cup shaped and the spring means is received within the head.

3. A central support according to claim 2 including a lubrication passage in the shaft connecting the sliding surface of the shaft with the interior of the cylindrical chamber and a lubricant feed passage having therein a non-return valve, communicating with the cylindrical chamber, the arrangement being such that axial movement of the piston head produces a pumping action through the passages.

4. A central support according to claim 3 wherein a groove is provided on the exterior of the shaft communicating with the lubrication passage.

* * * * *